(12) United States Patent
Pozzi

(10) Patent No.: US 9,809,018 B2
(45) Date of Patent: Nov. 7, 2017

(54) COMPOSITE STRUCTURAL ELEMENT AND METHOD

(71) Applicant: B/E Aerospace, Inc., Wellington, FL (US)

(72) Inventor: Alexander Nicholas Pozzi, Winston-Salem, NC (US)

(73) Assignee: B/E AEROSPACE, INC., Wellington, FL (US)

( * ) Notice: Subject to any disclaimer, the term of this patent is extended or adjusted under 35 U.S.C. 154(b) by 553 days.

(21) Appl. No.: 13/804,317

(22) Filed: Mar. 14, 2013

(65) Prior Publication Data

US 2013/0244021 A1 Sep. 19, 2013

Related U.S. Application Data

(60) Provisional application No. 61/610,508, filed on Mar. 14, 2012.

(51) Int. Cl.
*B32B 37/14* (2006.01)
*B32B 3/26* (2006.01)
(Continued)

(52) U.S. Cl.
CPC ............ *B32B 37/14* (2013.01); *B29C 66/112* (2013.01); *B29C 66/114* (2013.01); *B29C 66/5346* (2013.01); *B29C 66/721* (2013.01); *B29C 66/7252* (2013.01); *B29C 66/72141* (2013.01); *B29C 66/72143* (2013.01); *B29C 66/73921* (2013.01); *B32B 3/26* (2013.01); *B64D 11/06* (2013.01); *B64D 11/0649* (2014.12); *B29C 65/02* (2013.01); *B29C 65/7841* (2013.01); *B29C 66/53462* (2013.01); *B29C 66/7212* (2013.01); *B29L 2031/3076* (2013.01);

(Continued)

(58) Field of Classification Search
CPC .... B32B 3/02; B32B 3/10; B32B 3/26; B32B 5/245; B32B 7/04; B32B 27/12; B32B 2260/046; B32B 2260/021; B32B 5/26; B29C 66/723; B29C 66/7254; B29C 66/725; B29L 2031/3076; B29L 2031/771; B29L 2031/737; B29L 2031/44–2031/448; C08J 5/12; C08J 5/005–5/10; C08J 5/124
USPC ........ 428/116–118, 300.7; 244/118.6, 122 R, 244/118.5
See application file for complete search history.

(56) References Cited

U.S. PATENT DOCUMENTS 5,098,778 A * 3/1992 Minnick ........................ 442/224
5,316,604 A * 5/1994 Fell ................................ 156/82
(Continued)

OTHER PUBLICATIONS

Nomex.TM. Honeycomb, Technical Bulletin, downloaded from internet Dec. 23, 2016.*

*Primary Examiner* — Jennifer A Steele
(74) *Attorney, Agent, or Firm* — Shumaker, Loop & Kendrick, LLP

(57) ABSTRACT

A structural element that includes a central part formed of a fibrous material suspended in a thermoplastic matrix and at least one side part formed of a fibrous material suspended in a thermoplastic matrix and having at least one void therein. The central part and the at least one side part are bonded together while in a heated thermoplastic state to form a single, integral structure characterized by the absence of discontinuity across the bond plane of the structure.

3 Claims, 2 Drawing Sheets

(51) Int. Cl.
  *B64D 11/06*   (2006.01)
  *B29C 65/00*   (2006.01)
  *B29C 65/02*   (2006.01)
  *B29L 31/30*   (2006.01)
  *B29C 65/78*   (2006.01)
  *B29L 31/00*   (2006.01)

(52) U.S. Cl.
  CPC ... *B29L 2031/737* (2013.01); *B29L 2031/771* (2013.01); *Y02T 50/433* (2013.01); *Y02T 50/46* (2013.01); *Y10T 428/249921* (2015.04); *Y10T 428/249986* (2015.04)

(56) References Cited

U.S. PATENT DOCUMENTS

2002/0001703 A1* 1/2002 Funakoshi ............... 428/294.7
2002/0015837 A1* 2/2002 Funakoshi ............... 428/317.9
2008/0150342 A1* 6/2008 Kismarton ............ B64D 11/06
                                                297/452.18

\* cited by examiner

COMPOSITE STRUCTURAL ELEMENT AND METHOD

TECHNICAL FIELD AND BACKGROUND OF THE INVENTION

This invention relates to aircraft structural seating elements, for example, spreader beams and similar structural components. Typical prior art structural elements are fabricated from metal, typically aluminum, and are machined, forged, stamped or otherwise fabricated from a single blank. Traditionally, the spreader or leg components of an aircraft seating product have been machined or formed as an open section such as an I-Beam, rather than as a closed section. Typically, when closed section structures have been made, such as welded tubular spreader or legs, the result has been a multi-segmented part joined by welds or adhesives that have significantly different mechanical properties as compared to the base material. In an effort to further reduce weight in aircraft parts, it is desirable to fabricate as many parts as possible from materials that are lightweight, while maintaining or even enhancing the strength of the parts.

SUMMARY OF THE INVENTION

Therefore, it is an object to provide a cost effective, repeatable method of creating strong structural elements for aerospace, and aircraft seating and seating components in particular.

It is another object of the invention to provide an aircraft passenger seat and aircraft seat components that are fabricated of structural elements that are manufactured of lightweight yet extremely strong composite materials that furnish both weight reduction and strength characteristics.

These and other objects and advantages of the present invention are achieved in the preferred embodiment disclosed below by providing structural element that includes a central part formed of a fibrous material suspended in a thermoplastic matrix and at least one side part formed of a fibrous material suspended in a thermoplastic matrix. The central part and the at least one side part are bonded together while in a heated thermoplastic state to form a single, integral structure characterized by the absence of discontinuity across the bond plane of the structure.

According to another embodiment of the invention, the at least one side part comprises first and second side parts, wherein the first side part is bonded to a first side of the central part and the second side part is bonded to a second side of the central part.

According to another embodiment of the invention, the central part has a continuous periphery and an array of weight-reducing interior voids therein.

According to another embodiment of the invention, the central part and the first and second side parts have the same peripheral shape.

According to another embodiment of the invention, the central part has a continuous periphery and an array of weight-reducing interior voids therein and the at least one side part has a continuous periphery and a solid body overlying the weight-reducing interior voids of the central part.

According to another embodiment of the invention, a structural element a central part formed of a fibrous material suspended in a thermoplastic matrix and having a continuous periphery and an array of weight-reducing interior voids therein, and first and second side parts, each having a continuous periphery and a solid body overlying the weight-reducing interior voids of the central part. The first side part is bonded to a first side of the central part and the second side part is bonded to a second side of the central part while in a heated thermoplastic state to form a single, integral structure characterized by the absence of discontinuity across the bond plane of the structure.

According to another embodiment of the invention, the combined thickness of the first and second side parts is less than the thickness of the central part.

According to another embodiment of the invention, the side parts comprise side plates of a spreader beam of an aircraft seat.

According to another embodiment of the invention, a method of forming a structural element is provided, and includes the steps of forming a central part that is composite of a chopped or short fiber fill material molded with a composite matrix material, and forming at least one side part of woven, directional weave materials embedded in a thermoplastic resin of a type compatible with the central part that can be heat formed or bonded in situ. The central part and the at least one side part are heated, and the central part at the at least one side part are bonded together to form a single, integral structure characterized by the absence of discontinuity across the bond plane of the structure.

According to another embodiment of the invention, the step of forming the at least one side part includes the step of forming first and second side parts.

According to another embodiment of the invention, the step of forming the central part comprises the step selected from the group of steps consisting extruding, molding or pultruding the central part.

According to another embodiment of the invention, the method includes the steps of forming the central part with a continuous periphery and forming an array of weight-reducing interior voids therein.

According to another embodiment of the invention, the method includes the step of forming the central part and the first and second side parts with the same peripheral shape.

According to another embodiment of the invention, the step of forming the central part includes the step of forming a continuous periphery and an array of weight-reducing interior voids therein, and the step of forming the at least one side part includes the step of forming a continuous periphery and a solid body overlying the weight-reducing interior voids of the central part.

According to another embodiment of the invention, the method includes the step of forming the central part and the step of forming the at least one side part comprises the step of forming a spreader beam for a seat.

According to another embodiment of the invention, the method includes the steps of forming an aircraft passenger seat that includes a plurality of spaced-apart spreader beams, each spreader beam formed from a central part and first and second side parts.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1:
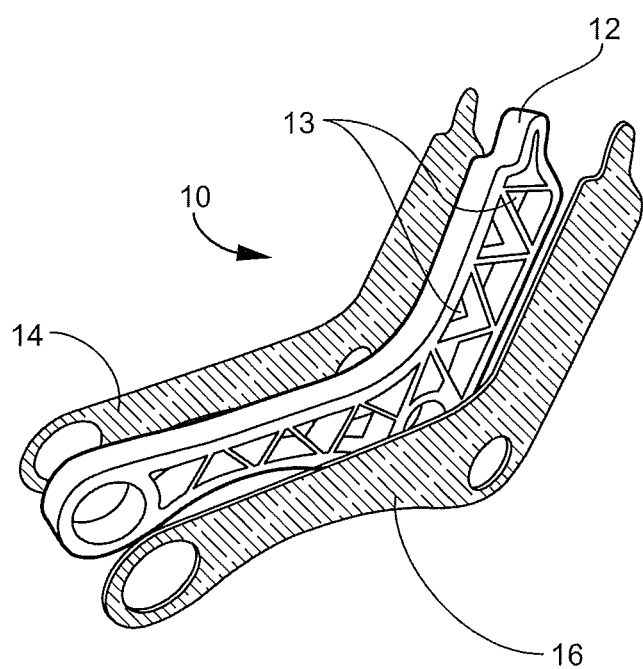
FIG. 1 is an exploded view of an aircraft seat structural part, by way of example, a spreader beam, made according to the method according to the invention.
Figure 2:
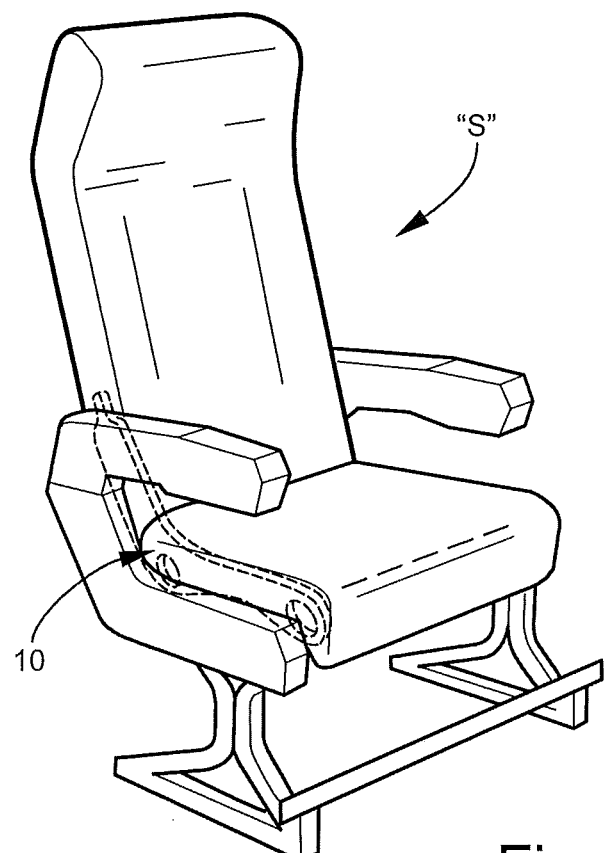
FIG. 2 is an aircraft seat that includes structural parts according to the invention, and made according to the method of the invention.

Referring now specifically to the drawings, a spreader beam 10 is shown in FIG. 1 and forms a structural element of an aircraft passenger seat "S" illustrated in FIG. 2. The beam 10 includes a central beam part 12 and a pair of side parts in the form of plates 14, 16 that are bonded to opposite sides of the central beam part 12. The central beam part 12 may be an extruded, molded or pultruded composite formed of a chopped or short fiber fill material molded with a composite matrix material. The fiber fill material may be selected from a wide variety of suitable fiber material, including carbon fiber and similar high-strength, low weight materials. The fibrous material is suspended in a thermoplastic material matrix rather than a thermoset material. The beam part 12 may be formed with through voids 13 in the structure, as shown. The use of a thermoplastic matrix material permits a wide variety of formation techniques to be used.

Side plates 14, 16 are formed of woven, directional weave materials embedded in a thermoplastic resin similar to the material of the central beam part 12. The side plates 14, 16 can thus be heat formed or bonded in situ, or similarly welded by other means. Using thermoplastic composites permits the base matrix that holds the fibers to be pressed together to form a single continuous section while the structural elements are remelted to form a single continuous section once the thermoplastic re-solidifies. The result is a single, hollow, monocoque structure that is lighter than comparable aluminum structures yet with enhanced strength. There is no discontinuity across the bond plane of the beam 10 and the part is therefore stronger.

The woven and molded strengthening materials can be fabricated from dissimilar processes and yet bonded into a single homogenous matrix. The techniques can thus be adapted for use with many types of parts and part components. In general, any loaded part that uses machined I-beam or C-sections can be replaced with a part fabricated in accordance with the disclosure of this application.

A structural element formed of multiple layers of thermoplastic composite material is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I Claim:

1. An aircraft seat spreader beam corresponding to outer sides of a seat pan and seat back of an assembled aircraft seat, the aircraft seat spreader beam comprising:
   (a) a central part formed of a fibrous material suspended in a thermoplastic matrix, the central part having a continuous periphery forming a predetermined shape and internal portions separated by an array of weight-reducing interior voids, the internal portions are each diagonally oriented relative to the continuous periphery and directly connected to the continuous periphery thereby reinforcing the central part;
   (b) a first and second side part, each side part formed of woven materials embedded in a thermoplastic matrix; and
   (c) the central part positioned between the first and second side parts being directly bonded together while in a heated thermoplastic state to form a single, integral structure with the absence of discontinuity across the bond plane of the structure, wherein:
   the spreader beam includes a through hole adapted for attachment of the aircraft seat spreader beam to an aircraft seat.

2. The aircraft seat spreader beam according to claim 1, wherein the spreader beam consists of the first and second side parts and the central part.

3. The aircraft seat spreader beam according to claim 2, wherein the central part and the first and second side parts have the same peripheral shape.

* * * * *